(12) United States Patent
Soderstrom

(10) Patent No.: US 7,309,474 B2
(45) Date of Patent: Dec. 18, 2007

(54) COMPOSITION AND PROCESS

(75) Inventor: Matthew D. Soderstrom, Whitehouse Station, NJ (US)

(73) Assignee: Cytec Technology Corp., Wilmington, DE (US)

( * ) Notice: Subject to any disclaimer, the term of this patent is extended or adjusted under 35 U.S.C. 154(b) by 372 days.

(21) Appl. No.: 10/825,984

(22) Filed: Apr. 16, 2004

(65) Prior Publication Data

US 2004/0208807 A1    Oct. 21, 2004

(51) Int. Cl.
*B01D 11/01*     (2006.01)
*C01B 31/16*     (2006.01)

(52) U.S. Cl. .......................... 423/24; 252/184; 423/49; 423/99; 423/139; 423/658.5; 423/DIG. 14

(58) Field of Classification Search .................. 423/24, 423/99, 139, 49, 658.5, DIG. 14; 252/184
See application file for complete search history.

(56) References Cited

U.S. PATENT DOCUMENTS

| 4,507,268 A | 3/1985 | Kordosky et al. ............. 423/24 |
| 4,544,532 A | 10/1985 | Kordosky et al. ............. 423/24 |
| 6,177,055 B1 | 1/2001 | Virnig et al. ................. 423/24 |

FOREIGN PATENT DOCUMENTS

| EP | 0202833 | 1/1991 |
| WO | WO96/25525 | 8/1996 |

*Primary Examiner*—Wayne A. Langel
*Assistant Examiner*—James Fiorito
(74) *Attorney, Agent, or Firm*—Fran S. Wasserman; Elizabeth Galletta; Claire M. Schultz

(57) ABSTRACT

A solvent extraction composition is comprised of one or more orthohydroxyarylaldoximes and one or more othohydroxyarylketoximes, and one or more equilibrium modifiers in an amount providing a degree of modification of the orthohydroxyarylaldoximes from about 0.2 to 0.61

11 Claims, No Drawings

COMPOSITION AND PROCESS

The present invention concerns a solvent extraction composition, a solvent extraction process and especially a process for the extraction of metals, particularly copper, from aqueous solutions, especially solutions obtained by leaching ores.

It is known to extract metals, especially copper, from aqueous solutions containing the metal in the form of, for example, a salt, by contacting the aqueous solution with a solution of a solvent extractant in a water immiscible organic solvent and then separating the solvent phase loaded with metal, i.e. containing at least a part of the metal in the form of a complex. The metal can then be recovered by stripping with a solution of lower pH followed for example, by electrowinning. Most commonly, the aqueous metal-containing solutions for extraction are the result of the acid leaching of ores. However it is known that some metals, especially copper, can be leached from certain ores with ammoniacal solutions. This has the advantage that solutions containing especially high concentrations of copper are derived and that there is little contamination of the solution with iron.

Solvent extractants which have found favour in recent years particularly for the recovery of copper from aqueous solutions include oxime reagents, especially o-hydroxyarylaldoximes and o-hydroxyarylketoximes. Whilst such reagents have been found to work well in the recovery of copper from solutions, one problem which has been encountered in the application of such reagents is that the aldoxime and ketoxime reagents can strongly bind metals to the extent that the efficiency of metal transfer from leach solution to strip solution can be impaired. In order to overcome such problems, modifiers have frequently been used with an aldoxime and ketoxime reagent to effect the binding efficiency of the extractants. Typical modifiers are disclosed in W096/25525, and in particular a class of highly branched ester modifiers are disclosed in EP-A-0202833.

Solvent extraction processes are employed in diverse situations, and much work has been done to identify suitably extractant compositions.

In particular U.S. Pat. No. 4,507,268 and U.S. Pat. No. 4,544,532 disclose that by employing aldoxime compositions that additionally comprise a ketoxime reagent, efficient copper recovery can be achieved when much lesser amounts of kinetic and equilibrium modifiers are employed than would be used with purely aldoxime compositions. Further, according to U.S. Pat. No. 4,507,268 and U.S. Pat. No. 4,544,532, it is preferred that no modifier is present with aldoxime compositions that additionally comprise a ketoxime reagent.

However, it has surprisingly been found that compositions comprising aldoxime/ketoxime mixtures should contain at least comparable and often greater amounts of kinetic and equilibrium modifiers as would be required if aldoxime was used alone.

According to a first aspect of the present invention, there is provided a solvent extraction composition comprising one or more orthohydroxyarylaldoximes and one or more orthohydroxyarylketoximes, and one or more equilibrium modifiers in an amount providing a degree of modification of the orthohydroxyarylaldoximes present of from about 0.2 to 0.61.

The compositions preferably also comprise a water immiscible organic solvent.

Compositions according to the present invention may facilitate higher copper transfer in solvent extraction circuits. Higher copper transfer can be translated into increased metal recovery which may result in lower O/A ratios, or lower reagent concentrations for a given recovery. Composition according to the present invention may find particular use with lower acid concentration strip solutions.

The orthohydroxyarylketoxime compounds employed in the present invention are substantially water insoluble and preferably have the formula:

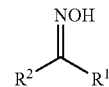

Formula (1)

Wherein $R^1$ is an optionally substituted hydrocarbyl group $R^2$ is an optionally substituted ortho-hydroxyaryl group, and salts thereof.

The orthohydroxyarylaldoxime compounds employed in the present invention are substantially water insoluble and preferably have the formula:

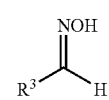

Formula (2)

wherein $R^3$ is an optionally substituted ortho-hydroxyaryl group, and salts thereof.

Whilst the invention is described herein with reference to compounds of Formula (1) and (2), it is understood that it relates to said compound in any possible tautomeric forms, and also the complexes formed between orthohydroxyarylaldoximes or orthohydroxyarylketoximes and metals, particularly copper.

Optionally substituted hydrocarbyl groups which may be represented by $R^1$ preferably comprise optionally substituted alkyl and aryl groups including combinations of these, such as optionally substituted aralkyl and alkaryl groups.

Examples of optionally substituted alkyl groups which may be represented by $R^1$ include groups in which the alkyl moieties can contain from 1 to 20, especially from 1 to 4, carbon atoms. A preferred orthohydroxyarylketoxime is one in which $R^1$ is alkyl, preferably containing up to 20, and especially up to 10, and more preferably up to 3 saturated aliphatic carbon atoms, and most preferably $R^1$ is a methyl group.

Examples of optionally substituted aryl groups which may be represented by $R^1$ include optionally substituted phenyl groups. When $R^1$ is an aryl group, it is preferably an unsubstituted phenyl group.

Optionally substituted ortho-hydroxyaryl groups which each independently may be represented by $R^2$ and $R^3$ include optionally substituted phenols. Examples of optionally substituted phenols which each independently may be represented by $R^2$ and $R^3$ include those of formula:

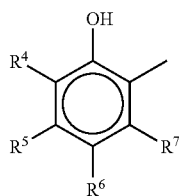

wherein $R^4$ to $R^7$ each independently represent H or a $C_1$ to $C_{22}$, preferably a $C_7$ to $C_{15}$, linear or branched alkyl group. Particularly preferably only $R^6$ represents a $C_{1-22}$ alkyl group, most preferably a $C_7$ to $C_{15}$ alkyl group, with $R^4$, $R^5$ and $R^7$ representing H.

When any of $R^1$, $R^2$ or $R^3$ is substituted, the substituent(s) should be such as not to affect adversely the ability of the orthohydroxyarylaldoxime or orthohydroxyarylketoxime to complex with metals, especially copper. Suitable substituents include halogen, nitro, cyano, hydrocarbyl, such as $C_{1-20}$-alkyl, especially $C_{1-10}$-alkyl; hydrocarbyloxy, such as $C_{1-20}$-alkoxy, especially $C_{1-10}$-alkoxy; hydrocarbyloxycarbonyl, such as $C_{1-20}$-alkoxycarbonyl, especially $C_{1-10}$-alkoxycarbonyl; acyl, such as $C_{1-20}$-alkylcarbonyl and arylcarbonyl, especially $C_{1-10}$-alkylcarbonyl and phenylcarbonyl; and acyloxy, such as $C_{1-20}$-alkylcarbonyloxy and arylcarbonyloxy, especially $C_{1-10}$-alkylcarbonyloxy and phenylcarbonyloxy. There may be more than one substituent in which case the substituents may be the same or different.

In many embodiments, the orthohydroxyarylketoxime is a 5-($C_8$ to $C_{14}$ alkyl)-2-hydroxyacetophenone oxime, more often a 5-($C_9$ to $C_{12}$ alkyl)-2-hydroxyacetophenone oxime, and particularly 5-nonyl-2-hydroxyacetophenone oxime.

In many embodiments, the orthohydroxyarylaldoxime is a 5-($C_8$ to $C_{14}$ alkyl)-2-hydroxybenzaldoxime, more often a 5-($C_9$ to $C_{12}$ alkyl)-2-hydroxybenzaldoxime, and particularly 5-nonyl-2-hydroxybenzaldoxime.

The compositions may often comprise more than one different orthohydroxyarylaldoximes and/or more than one different orthohydroxyarylketoximes in which the nature of the substituent groups represented by $R^1$ and $R^2$ differ between component orthohydroxyarylketoximes and/or the substituent groups represented by $R^3$ differ between component orthohydroxyarylaldoximes, especially where the component orthohydroxyarylaldoximes and/or orthohydroxyarylketoximes are isomeric. Such isomeric mixtures may have better solubility in organic solvents than when a single orthohydroxyarylketoxime and a single orthohydroxyarylaldoxime is present.

The orthohydroxyarylaldoximes and orthohydroxyarylketoximes are often present in a total amount of up to 60% by weight of the composition, commonly no more than 50%, and usually no more than 40% w/w. Often, the total amount of orthohydroxyarylaldoxime and orthohydroxyarylketoxime comprises at least 1% by weight, commonly at least 2.5% by weight and usually at least 5% by weight of composition, and preferably comprises from 7.5 to 20%, such as about 10%, by weight of the composition.

Equilibrium modifiers employed in the present invention are substantially water insoluble. Suitable equilibrium modifiers can be alkylphenols, alcohols, esters, ethers and polyethers, carbonates, ketones, nitriles, amides, carbamates, sulphoxides, and salts of amines and quaternary ammonium compounds.

Alkylphenols which may be used as modifiers in conjunction with the extractant include alkylphenols containing from 3 to 15 alkyl carbon atoms, for example 4-tert-butylphenol, 4-heptylphenol, 5-methyl-4-pentylphenol, 2-chloro-4-nonylphenol, 2-cyano-4-nonylphenol, 4-dodecylphenol, 3-pentadecylphenol and 4-nonylphenol and mixtures thereof. The preferred phenols contain alkyl groups having from 4 to 12 carbon atoms, especially the mixed 4-nonylphenols obtained by condensation of phenol and propylene trimer.

Alcohols which may be used as modifiers in conjunction with the extractant include saturated and unsaturated hydrocarbon alcohols and polyols containing 14 to 30, preferably 15 to 25 carbon atoms. The alcohols are preferably highly branched with the hydroxyl group located approximately midway along the hydrocarbon backbone. Especially preferred are the branched chain alcohols that may be made by condensation of short chain alcohols by the Guerbet process, such alcohols sometimes being referred to as Guerbet alcohols. Optionally, the alcohols may contain an aromatic group or other functional group, particularly an ester group.

Especially useful alcohols may be synthesised from highly branched precursors leading to very highly branched Guerbet alcohols containing a large number of terminal methyl groups. Examples of particularly efficient alcohol modifiers include highly branched isohexadecyl alcohol and iso-octadecyl alcohol, the latter being 2-(1,3,3-trimethylbutyl)-5,7,7-trimethyloctan-1-ol.

Esters which may be used as modifiers in conjunction with the extractant include saturated and unsaturated aliphatic and aromatic-aliphatic esters containing from 10 to 30 carbon atoms. The esters may be mono-esters or polyesters, especially di-esters. The esters are preferably highly branched. Optionally, the esters may contain other functional groups, particularly a hydroxyl group or ether group. Where the ester is a product of the reaction of an alcohol and a mono-carboxylic acid, it is preferred that the alcohol is an alkyl alcohol and comprises from 1 to 6 carbon atoms, and the mono-carboxylic acid comprise from 2 to 16 carbon atoms. Where the ester is a product of the reaction of an alcohol and a di-carboxylic acid, it is preferred that the alcohol is an alkyl alcohol and comprises from 1 to 6 carbon atoms, and the di-carboxylic acid comprises from 4 to 12 carbon atoms. Where the ester is a product of the reaction of a diol and a mono-carboxylic acid, it is preferred that the diol is an alkyl diol and comprises from up to 6 carbon atoms, and the mono-carboxylic acid comprises from 6 to 16 carbon atoms. Where the ester is a tri-alkyl phosphate, the alkyl groups each commonly comprise from 4 to 14 carbon atoms. Examples of useful esters include isodecyl acetate, methyl decanoate, 2-pentyl octanoate, n-hexyl hexanoate, methly isooctanoate, 1,4-butanediol dihexanoate, di-butyl adipate, di-isobutyl adipate, di-pentyl adipate, di-hexyl adipate, bis-2-ethoxyethyl adipate, dipropylene glycol dibenzoate, propylene glycol dibenzoate, tributyl phospate, trioctylphosphate, triethylhexylphosphate, 2,2,4-trimethyl-1,3-pentanediol mono-isobutyrate, 2,2,4-trimethyl-1,3-pentanediol mono-benzoate and particularly 2,2,4-trimethyl-1,3-pentanediol di-isobutyrate and 2,2,4-trimethyl-1,3-pentanediol di-benzoate.

Ethers which may be used as modifiers in conjunction with the extractant include hydrocarbon ethers and polyethers containing 12 to 30, preferably 15 to 25 carbon atoms. Examples of useful ethers and polyethers include benzyl 2-(2-butoxyethoxy)ethyl ether and benzyl 2-butoxyethyl ether.

Carbonates which may be used as modifiers in conjunction with the extractant include carbonates containing from 4 to 16 carbon atoms. Commonly, the carbonates are alkyl carbonates. Examples of useful carbonates include isobutylcarbonate, isotridecylcarbonate and a carbonate mixture comprising a mixture of $C_8$ and $C_{10}$ alkyl groups.

Ketones which may be used as modifiers in conjunction with the extractant include alkyl ketones in which the alkyl group contains from 1 to 20 carbon atoms. Examples of useful ketones include isobutyl heptylketone, nonanone, 2,6,8-trimethyl-4-nonanone, diundecyl ketone and 5,8-diethyldodecane-6,7-dione.

Nitriles which may be used as modifiers in conjunction with the extractant include aliphatic and araliphatic hydrocarbonitriles which comprise from 10 to 36 carbon atoms. Examples of useful nitrites include undecylnitrile and oleonitrile.

Amides which may be used as modifiers in conjunction with the extractant include amides containing from 8 to 20 carbon atoms. Amides comprise products which may be derived from the reaction of a primary or secondary amine with a mono- or di carboxylate acid or equivalent, in particular phosgene or equivalents. Examples of useful amides include N,N'-bis-2-ethylhexyl urea, N,N'-bis-2-ethylhexyl 2-ethylhexanamide, N-hexyl 2-ethylhexanamide, N,N'-dibutyl benzamide, N,N'-dibutyl octanamide, N,N'-dimethyl octanamide and N,N'-bis-2-ethylhexyl versatamide.

Carbamates which may be used as modifiers in conjunction with the extractant include alkyl and aryl carbamates. Examples of useful carbamates include N-octyl isotridecylcarbamate and isotridecyl N-tolylcarbamate.

Sulphoxides which may be used as modifiers in conjunction with the extractant include alkyl sulphoxides. An example of a useful sulphoxide is di-2-ethylhexyl sulphoxide.

Salts of amines and quaternary ammonium compounds which may be used as modifiers in conjunction with the extractant include tertiary amines and quaternary ammonium compounds containing alkyl groups having from 8 to 18 carbon atoms and sulphonic acid salts thereof. Examples of sulphonic acids include dinonyinapthalene sulphonic acid and toluene sulphonic acid.

In the context of the present invention, 'highly branched' as applied to the alcohols and esters means that the ratio of the number of methyl carbon atoms to non-methyl carbon atoms is higher than 1:5 and preferably higher than 1:3.

If desired, mixtures of compounds selected from the group consisting of alkylphenols, alcohols, esters, ethers, polyethers, carbonates, ketones, nitriles, amides, carbamates, sulphoxides, and salts of amines and quaternary ammonium compounds may be employed as modifiers. Particularly preferred are mixtures comprising a first compound selected from the group consisting of alkylphenols, alcohols, esters, ethers, polyethers, carbonates, ketones, nitriles, amides, carbamates, sulphoxides, and salts of amines and quaternary ammonium compounds and a second compound selected from the group consisting of alkanols having from 6 to 18 carbon atoms, an alkyl phenol in which the alkyl group contains from 7 to 12 carbon atoms, and tributylphosphate.

Preferably one or more equilibrium modifiers selected from 2,2,4-trimethyl-1,3-pentanediol mono-isobutyrate, 2,2,4-trimethyl-1,3-pentanediol mono-benzoate, 2,2,4-trimethyl-1,3-pentanediol di-isobutyrate, 2,2,4-trimethyl-1,3-pentanediol di-benzoate, di-butyl adipate, di-pentyl adipate, di-hexyl adipate, isobutyl heptyl ketone, nonanone, 2,6,8-trimethyl-4-nonanone, diundecyl ketone, 5,8-diethyldodecane-6,7-dione, tridecanol, and nonyl phenol are employed. One or more equilibrium modifiers are present in an amount that provides a degree of modification of the orthohydroxyarylaldoximes present of from about 0.2 to 0.61, more preferably from about 0.3 to 0.59, and most preferably from about 0.4 to 0.6.

As employed herein, "degree of modification" designates the inverse ratio of (a) the stripped solvent copper level of an hydroxy aryl aldoxime extractant at equilibrium (expressed in terms of grams per liter of copper) extracted with an aqueous solution containing a fixed concentration of copper and sulfuric acid to (b) the stripped solvent copper level of the same extractant under the same conditions when a selected equilibrium modifier additive is present. Consistent with this definition, the presence of relatively small quantities of an equilibrium modifier will shift the extraction equilibrium slightly, resulting in minor diminution of aldoxime stripped solvent copper level at equilibrium, as will be reflected by a degree of modification value closely approaching 1.0, e.g., 0.99. Increased effective quantities of modifier under otherwise identical conditions will result in a more pronounced shift in extraction equilibrium and a more pronounced diminution of aldoxime stripped solvent copper level at equilibrium, as will be reflected by a degree of modification corresponding less than 1.0.

Expectedly, the degree of modification resulting from a given molar ratio of equilibrium modifier to aldoxime in a reagent will vary depending on such factors as the degree of purity of the extractant composition employed in formulation of the reagent, the aromaticity of the solvent, and, perhaps most significantly, the chemical identity of the equilibrium modifier employed. It will also depend significantly on the conditions involved in determination of stripped solvent copper levels. Consequently, for purposes of determining degree of modification of an aldoxime by a given equilibrium modifier, the following test conditions should be adhered to. The temperature at which the determination is made should be about 24° C. The molar concentration of aldoxime (or mixture of aldoximes) in the diluent should be about 0.184 as determined by copper loading and titration and an aldoxime stock of approximately 94 percent purity (with the remainder being substantially alkyl phenol starting material residue) should be employed. The diluent should be Escaid 100 or a mixture of aliphatic and aromatic hydrocarbons closely approximating the constitution of Escaid 100. An atomic absorption methodology should be employed for determining copper content. The composition of the strip solution should be 150 g/l sulfuric acid and 30 g/l $Cu^{2+}$. The foregoing conditions are employed in determining degree of modification according to the invention because they represent conditions closely resembling those commonly extant in commercial solvent extraction facilities for recovery of copper.

Organic solvents which may be present in the composition include any mobile organic solvent, or mixture of solvents, which is immiscible with water and is inert under the extraction conditions to the other materials present. Preferably the organic solvent has a low aromatic hydrocarbon content.

Preferred organic solvents are hydrocarbon solvents which include aliphatic, alicyclic and aromatic hydrocarbons and mixtures thereof as well as chlorinated hydrocarbons such as trichloroethylene, perchloroethylene, trichloroethane and chloroform.

Highly preferred organic solvents having a low aromatics content include solvents and solvent mixtures where the amount of aromatic hydrocarbons present in the organic solvent is less than 30%, usually around 23% or less, often less than 5%, and frequently less than 1%.

Examples of suitable hydrocarbon solvents include ESCAID 110, ESCAID 115, ESCAID 120, ESCAID 200, and ESCAID 300 commercially available from Exxon (ESCAID is a trade mark), SHELLSOL D70 and D80 300 commercially available from Shell (SHELLSOL is a trade mark), and CONOCO 170 commercially available from Conoco (CONOCO is a trade mark). Suitable solvents are hydrocarbon solvents include high flash point solvents and solvents with a high aromatic content such as SOLVESSO 150 commercially available from Exxon (SOLVESSO is a trade mark).

More preferred are solvents with a low aromatic content. Certain suitable solvents with a low aromatic content, have aromatic contents of <1% w/w, for example, hydrocarbon solvents such as ESCAID 110 commercially available from Exxon (ESCAID is a trade mark), and ORFOM SX 10 and ORFOM SX11 commercially available from Phillips Petroleum (ORFOM is a trade mark). Especially preferred, however on grounds of low toxicity and wide availability, are hydrocarbon solvents of relatively low aromatic content such as kerosene, for example ESCAID 100 which is a petroleum distillate with a total aromatic content of 23% commercially available from Exxon (ESCAID is a trade mark), or ORFOM SX7, commercially available from Phillips Petroleum (ORFOM is a trade mark).

In many embodiments, the composition comprises at least 30%, often at least 45% by weight, preferably from 50 to 95% w/w of water-immiscible hydrocarbon solvent. Advantageously, it may be preferred to make and supply the composition in the form of a concentrate. The concentrate may then be diluted by the addition of organic solvents as described herein above to produce compositions in the ranges as described herein above. Where the concentrate contains a solvent, it is preferred that the same solvent is used to dilute the concentrate to the "in use" concentration range. In many embodiments, the concentrate composition comprises up to 30%, often up to 20% by weight, preferably up to 10% w/w of water-immiscible hydrocarbon solvent. Often the concentrate composition comprises greater than 5% w/w of water-immiscible hydrocarbon solvent. In certain high strength concentrates it may be necessary to employ a higher than normal aromatic hydrocarbon content. In such cases where a high aromatic hydrocarbon containing solvent is used in the concentrate, solvent of very low aromatic hydrocarbon content may be used to dilute the concentrate to the "in use" concentration range.

According to a second aspect of the present invention, there is provided a process for the extraction of a metal from solution in which an acidic solution containing a dissolved metal is contacted with a solvent extraction composition, whereby at least a fraction of the metal is extracted into the organic solution, characterised in that the solvent extraction composition comprises a water immiscible organic solvent, one or more orthohydroxyarylaldoximes and one or more orthohydroxyarylketoximes, and one or more equilibrium modifiers in an amount providing a degree of modification of the orthohydroxyarylaldoximes present of from about 0.2 to 0.61.

Metals that may be extracted in the process according to the second aspect of the present invention include copper, cobalt, nickel, manganese and zinc, most preferably copper.

The orthohydroxyarylaldoximes, orthohydroxyarylketoximes, the equilibrium modifiers and the water immiscible organic solvent are as herein described before.

The aqueous acidic solution from which metals are extracted by the process of the second aspect of the present invention often has a pH in the range of from −1 to 7, preferably from 0 to 5, and most preferably from 0.25 to 3.5. Preferably, when the metal to be extracted is copper pH values of less than 3 chosen so that the copper is extracted essentially free of iron, cobalt or nickel. The solution can be derived from the leaching of ores or may be obtained from other sources, for example metal containing waste streams such as from copper etching baths.

The concentration of metal, particularly copper, in the aqueous acidic solution will vary widely depending for example on the source of the solution. Where the solution is derived from the leaching of ores, the metal concentration is often up to 75 g/l and most often from 1 to 40 g/l. Where the solution is a waste stream, the metal concentrations can vary from 0.5 to 2 g/l for a waste water stream, to somewhat higher for those from other waste streams, for example Printed Circuit Board waste streams, and can be up to 150 g/l, usually from 75 to 130 g/l.

Preferred solvent extraction compositions are those which comprise a 5-($C_8$ to $C_{14}$ alkyl)-2-hydroxybenzaldoxime and 5-($C_8$ to $C_{14}$ alkyl)-2-hydroxyacetophenone oxime in a ratio of from about 90:10 to about 50:50 aldoxime to ketoxime, and contain one or more modifiers selected from 2,2,4-trimethyl-1,3-pentanediol mono-isobutyrate, 2,2,4-trimethyl-1,3-pentanediol mono-benzoate, 2,2,4-trimethyl-1,3-pentanediol di-isobutyrate, 2,2,4-trimethyl-1,3-pentanediol di-benzoate, butyl adipate, pentyl adipate, hexyl adipate, isobutyl heptyl ketone, nonanone, diundecyl ketone, 5,8-diethyldodecane-6,7-dione, tridecanol, and nonyl phenol in an amount sufficient to provide a degree of modification of 0.61 or lower.

The process of the second aspect of the present invention can be carried out by contacting the solvent extractant composition with the aqueous acidic solution. Ambient or elevated temperatures, such as up to 75° C. can be employed if desired. Often a temperature in the range of from 5 to 60° C., and preferably from 15 to 40° C., is employed. The aqueous solution and the solvent extractant are usually agitated together to maximise the interfacial areas between the two solutions. The volume ratio of solvent extractant to aqueous solution are commonly in the range of from 20:1 to 1:20, and preferably in the range of from 5:1 to 1:5. In many embodiments, to reduce plant size and to maximise the use of solvent extractant, organic to aqueous volume ratios close to 1:1 are maintained by recycle of one of the streams.

After contact with the aqueous acidic solution, the metal can be recovered from the solvent extractant by contact with an aqueous acidic strip solution.

The aqueous strip solution employed in the process according to the second aspect of the present invention is usually acidic, commonly having a pH of 2 or less, and preferably a pH of 1 or less, for example, a pH in the range of from −1 to 0.5. The strip solution commonly comprises a mineral acid, particularly sulphuric acid, nitric acid or hydrochloric acid. In many embodiments, acid concentrations, particularly for sulphuric acid, in the range of from 130 to 200 g/l and preferably from 150 to 180 g/l are employed. When the extracted metal is copper, preferred strip solutions comprise stripped or spent electrolyte from a copper electro-winning cell, typically comprising up to 80 g/l copper, often greater than 20 g/l copper and preferably from 30 to 70 g/l copper, and up to 220 g/l sulphuric acid, often greater than 120 g/l sulphuric acid, and preferably from 150 to 180 g/l sulphuric acid.

The volume ratio of organic solution to aqueous strip solution in the process of the second aspect of the present invention is commonly selected to be such so as to achieve transfer, per litre of strip solution, of up to 50 g/l of metal, especially copper into the strip solution from the organic solution. In many industrial copper electrowinning processes transfer is often from 10 g/l to 35 g/l, and preferably from 15 to 20 g/l of copper per litre of strip solution is transferred from the organic solution. Volume ratios of organic solution to aqueous solution of from 1:2 to 15:1 and preferably from 1:1 to 10:1, especially less than 6:1 are commonly employed.

Both the separation and stripping process can be carried out by a conventional batch extraction technique or column contactors or by a continuous mixer settler technique. The latter technique is generally preferred as it recycles the stripped organic phase in a continuous manner, thus allowing the one volume of organic reagent to be repeatedly used for metal recovery.

A preferred embodiment of the second aspect of the present invention comprises a process for the extraction of a metal from aqueous acidic solution in which:

in step 1, the solvent extraction composition comprising a water immiscible organic solvent, one or more orthohydroxyarylaldoximes and one or more orthohydroxyarylketoximes, and one or more equilibrium modifiers in an amount providing a degree of modification of the orthohydroxyarylaldoximes present of from about 0.2 to 0.61 is first contacted with the aqueous acidic solution containing metal;

in step 2, separating the solvent extraction composition containing metal-solvent extractant complex from the aqueous acidic solution;

in step 3, contacting the solvent extraction composition containing metal-solvent extractant complex with an aqueous acidic strip solution to effect the stripping of the metal from the water immiscible phase;

in step 4, separating the metal-depleted solvent extraction composition from the loaded aqueous strip solution.

The invention is further illustrated, but not limited, by the following examples.

EXAMPLES

An extractant composition was prepared by mixing 25 g of 2-hydroxy-5-nonylsalicylaldoxime (an aldoxime), 25 g of 2-hydroxy-5-nonylacetophenone oxime (a ketoxime), and varying amounts of 2,2,4-trimethyl-1,3-pentanediol di-isobutyrate (a modifier) in 1 litre of Orfom SX7.

100 ml of the extractant composition was then stirred with 500 ml of an aqueous acid copper ion containing solution for 30 min to simulate extraction. After 30 min the extractant composition was separated and then contacted with fresh aqueous acid copper ion containing solution. This procedure was repeated until there was no longer a change in the aqueous or organic copper concentration. A sample of the organic phase was then analysed for copper content.

The procedure was repeated with various aqueous acid copper containing solutions to simulate extraction and stripping conditions.

The Experiments below shows the equilibrium organic Cu loading and Cu stripping values obtained.

| | | Experiment 1 | | |
| --- | --- | --- | --- | --- |
| Aqueous Solution | Simulation | 25 gpl aldoxime: 25 gpl ketoxime Deg. Mod. = 1.0 Org Cu (gpl) | 25 gpl aldoxime: 25 gpl ketoxime: 16 gpl modifier Deg. Mod. = 0.58 Org Cu (gpl) | % transfer increase |
| 10.2 gpl Cu pH 2.0 45 gpl Cu 133.7 gpl $H_2SO_4$ | loading stripping | 5.86 2.48 | 5.82 1.96 | |
| | Transfer | 3.38 | 3.86 | 14.20% |

| | | Experiment 2 | | |
| --- | --- | --- | --- | --- |
| Aqueous Solution | Simulation | 25 gpl aldoxime: 25 gpl ketoxime Deg. Mod. = 1.0 Org Cu (gpl) | 25 gpl aldoxime: 25 gpl ketoxime: 16 gpl modifier Deg. Mod. = 0.58 Org Cu (gpl) | % transfer Increase |
| 5.0 gpl Cu pH 1.65 45 gpl Cu 133.7 gpl $H_2SO_4$ | loading stripping | 5.72 2.48 | 5.64 1.96 | |
| | Transfer | 3.24 | 3.68 | 13.58% |

| | | Experiment 3 | | |
| --- | --- | --- | --- | --- |
| Aqueous Solution | Simulation | 25 gpl aldoxime: 25 gpl ketoxime Deg. Mod. = 1.0 Org Cu (gpl) | 25 gpl aldoxime: 25 gpl ketoxime: 33 gpl modifier Deg. Mod. = 0.38 Org Cu (gpl) | % transfer increase |
| 10.2 gpl Cu pH 2.0 45 gpl Cu | loading stripping | 5.86 2.48 | 5.76 1.58 | |

| | | -continued | | |
|---|---|---|---|---|
| 133.7 gpl $H_2SO_4$ | Transfer | 3.38 | 4.18 | 23.67% |

| Experiment 4 | | | | |
|---|---|---|---|---|
| Aqueous Solution | Simulation | 25 gpl aldoxime: 25 gpl ketoxime Deg. Mod. = 1.0 Org Cu (gpl) | 25 gpl aldoxime: 25 gpl ketoxime: 33 gpl modifier Deg. Mod. = 0.38 Org Cu (gpl) | % transfer Increase |
| 5.0 gpl Cu pH 1.65 45 gpl Cu 133.7 gpl $H_2SO_4$ | loading stripping | 5.72 2.48 | 5.52 1.58 | |
| | Transfer | 3.24 | 3.94 | 21.60% |

| Experiment 5 | | | | |
|---|---|---|---|---|
| Aqueous Solution | Simulation | 25 gpl aldoxime: 25 gpl ketoxime Deg. Mod. = 1.0 Org Cu (gpl) | 25 gpl aldoxime: 25 gpl ketoxime: 50 gpl modifier Deg. Mod. = 0.22 Org Cu (gpl) | % transfer Increase |
| 10.2 gpl Cu pH 2.0 45 gpl Cu 133.7 gpl $H_2SO_4$ | loading stripping | 5.86 2.48 | 5.72 1.3 | |
| | Transfer | 3.38 | 4.42 | 30.77% |

| Experiment 6 | | | | |
|---|---|---|---|---|
| Aqueous Solution | Simulation | 25 gpl aldoxime: 25 gpl ketoxime Deg. Mod. = 1.0 Org Cu (gpl) | 25 gpl aldoxime: 25 gpl ketoxime: 50 gpl modifier Deg. Mod. = 0.22 Org Cu (gpl) | % transfer Increase |
| 5.0 gpl Cu pH 1.65 45 gpl Cu 133.7 gpl $H_2SO_4$ | loading stripping | 5.72 2.48 | 5.36 1.3 | |
| | Transfer | 3.24 | 4.06 | 25.31% |

During the simulation experiments, there was no evidence of crud formation when modifiers were employed.

What is claimed is:

1. A solvent extraction composition comprising one or more orthohydroxyarylaldoximes and one or more orthohydroxyarylketoximes, and one or more equilibrium modifiers selected from the group consisting of 2,2,4-trimethyl-1,3-pentanediol mono-isobutyrate, 2,2,4-trimethyl-1,3-pentanediol mono-benzoate, 2,2,4-trimethyl-1,3-pentanediol di-isobutyrate, 2,2,4-trimethyl-1,3-pentanediol di-benzoate, isobutyl heptyl ketone, nonanone, 2,6,8-trimethyl-4-nonanone, diundecyl ketone, 5,8-diethyldodecane-6,7-di-one, and tridecanol, in an amount providing a degree of modification of the orthohydroxyarylaldoximes present from about 0.2 to 0.61.

2. A solvent extraction composition according to claim 1 wherein the degree of modification is from about 0.4 to 0.6.

3. A solvent extraction composition according to claim 1 or 2 wherein the orthohydroxyarylketoximes are compounds of formula:

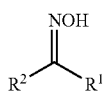

Formula (1)

wherein $R^1$ is an optionally substituted hydrocarbyl group $R^2$ is an optionally substituted ortho-hydroxyaryl group, and salts thereof, and the orthohydroxyarylaldoxime are compounds of the formula:

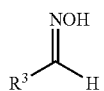

Formula (2)

wherein $R^3$ is an optionally substituted ortho-hydroxyaryl group, and salts thereof.

4. A solvent extraction composition according to claim 3 wherein the orthohydroxyarylketoxime is a 5-($C_8$ to $C_{14}$ alkyl)-2-hydroxyacetophenone oxime, and the orthohydroxyarylaldoxime is a 5-($C_8$ to $C_{t4}$ alkyl)-2-hydroxybenzaldoxime.

5. A solvent extraction composition according to claim 1 wherein the orthohydroxyarylketoxime is 2-hydroxy-5-nonylbenzophenone oxime, and the orthohydroxyarylaldoxime is 2-hydroxy-5-nonylsalicylaldoxime and the equilibrium modifier is 2,2,4-trimethyl-1,3-pentanediol di-isobutyrate.

6. A process for the extraction of a metal from solution in which an acidic solution containing a dissolved metal is contacted with a solvent extraction composition, whereby at least a fraction of the metal is extracted into the organic solution, characterised in that the solvent extraction composition comprises a water immiscible organic solvent, one or more orthohydroxyarylaldoximes and one or more orthohydroxyarylketoximes, and one or more equilibrium modifiers selected from the group consisting of 2,2,4-trimethyl-1,3-pentanediol mono-isobutyrate, 2,2,4-trimethyl-1,3-pentanediol mono-benzoate, 2,2,4-trimethyl-1,3-pentanediol di-isobutyrate, 2,2,4-trimethyl-1,3-pentanediol di-benzoate, isobutyl heptyl ketone, nonanone, 2,6,8-trimethyl-4-nonanone, diundecyl ketone, 5,8-diethyldodecane-6,7-dione, and tridecanol in an amount providing a degree of modification of the orthohydroxyarylaldoximes present from about 0.2 to 0.61.

7. A process according to claim 6 wherein the metal is copper, cobalt, nickel, manganese or zinc.

8. A process according to claim 7 wherein the degree of modification is from about 0.4 to 0.6.

9. A process according to any one of claims 6, 7 or 8 wherein the orthohydroxyarylketoximes are compounds of formula:

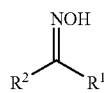

Formula (1)

wherein $R^1$ is an optionally substituted hydrocarbyl group $R^2$ is an optionally substituted ortho-hydroxyaryl group, and salts thereof, and the orthohydroxyarylaldoxime are compounds of the formula:

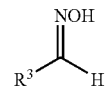

Formula (2)

wherein $R^3$ is an optionally substituted ortho-hydroxyaryl group, and salts thereof.

10. A process according to claim 9 wherein the orthohydroxyarylketoxime is a 5-($C_8$ to $C_{14}$ alkyl)-2-hydroxyacetophenone oxime, and the orthohydroxyarylaldoxime is a 5-($C_8$ to $C_{14}$ alkyl)-2-hydroxybenzaldoxime.

11. A process according to claim 10 wherein the orthohydroxyarylketoxime is 2-hydroxy-5-nonylbenzophenone oxime, and the orthohydroxyarylaldoxime is 2-hydroxy-5-nonylsalicylaldoxime and the equilibrium modifier is 2,2,4-trimethyl-1,3-pentanediol di-isobutyrate.

* * * * *